United States Patent [19]

Brezinski et al.

[11] Patent Number: 5,622,919
[45] Date of Patent: Apr. 22, 1997

[54] COMPOSITION AND METHOD FOR CONTROLLING PRECIPITATION WHEN ACIDIZING WELLS

[75] Inventors: Michael M. Brezinski; Tommy R. Gardner; Karen L. King; James L. Lane, Jr., all of Duncan, Okla.

[73] Assignee: Halliburton Company, Duncan, Okla.

[21] Appl. No.: 556,679

[22] Filed: Nov. 13, 1995

Related U.S. Application Data

[63] Continuation of Ser. No. 73,370, Jun. 7, 1993, which is a continuation-in-part of Ser. No. 840,371, Feb. 24, 1992, abandoned, Ser. No. 881,590, Jun. 29, 1992, abandoned, and Ser. No. 950,374, Sep. 23, 1992, abandoned.

[51] Int. Cl.$^6$ .............................. C09K 7/00; E21B 37/06
[52] U.S. Cl. .......................... 507/90; 507/203; 507/263; 585/950; 208/48 R; 208/48 AA; 166/304; 134/39; 134/40; 134/42; 210/698
[58] Field of Search .................................. 507/933, 934, 507/90, 203, 263; 585/950; 208/48 R, 48 AA; 166/304; 210/698; 134/39, 40, 42

[56] References Cited

U.S. PATENT DOCUMENTS

| | | | |
|---|---|---|---|
| 2,963,439 | 12/1960 | Eberhard | 252/151 |
| 3,142,335 | 7/1964 | Dill et al. . | |
| 3,696,040 | 10/1972 | Mayo | 252/87 |
| 4,091,073 | 5/1978 | Winkler | 423/226 |
| 4,096,914 | 6/1978 | McLaughlin et al. | 166/698 |
| 4,137,972 | 2/1979 | McLaughlin et al. | 166/307 |
| 4,143,052 | 3/1979 | Barrault et al. | 260/329 R |
| 4,167,214 | 9/1979 | Street | 166/307 |
| 4,169,797 | 10/1979 | Johnston et al. . | |
| 4,317,735 | 3/1982 | Crowe . | |
| 4,356,155 | 10/1982 | Blytas et al. | 423/226 |
| 4,420,565 | 12/1983 | Schmitt | 436/27 |
| 4,537,684 | 8/1985 | Gallup et al. | 210/696 |
| 4,574,050 | 3/1986 | Crowe et al. . | |
| 4,633,949 | 1/1987 | Crowe . | |
| 4,646,835 | 3/1987 | Watkins et al. | 166/295 |
| 4,675,120 | 6/1987 | Martucci . | |
| 4,676,916 | 6/1987 | Crema . | |
| 4,709,767 | 12/1987 | Alexander | 175/65 |
| 4,762,626 | 8/1988 | Emmons et al. . | |
| 4,781,901 | 11/1988 | Jeffrey | 423/226 |
| 4,784,778 | 11/1988 | Shin . | |
| 4,784,779 | 11/1988 | Dadgar . | |
| 4,815,537 | 3/1989 | Jones | 166/281 |
| 4,830,766 | 5/1989 | Gallup et al. | 252/87 |
| 4,836,286 | 6/1989 | Edwards | 166/304 |
| 4,871,024 | 10/1989 | Cizek | 166/307 |
| 4,888,121 | 12/1989 | Dill et al. . | |
| 4,949,790 | 8/1990 | Dill et al. | 166/307 |
| 5,017,281 | 5/1991 | Sadeghi et al. | 208/390 |
| 5,058,678 | 10/1991 | Dill et al. . | |
| 5,063,997 | 11/1991 | Pachla et al. | 166/279 |
| 5,073,270 | 12/1991 | Gallup et al. | 210/698 |

FOREIGN PATENT DOCUMENTS

| | | | |
|---|---|---|---|
| 873792 | 6/1971 | Canada | 31/25 |
| 1197673 | 12/1985 | Canada | 43/22 |
| 1275794 | 6/1990 | Canada | 31/32 |
| 1278178 | 12/1990 | Canada | 43/22 |
| 1281178 | 3/1991 | Canada | 14/24 |

*Primary Examiner*—Sharon Gibson
*Assistant Examiner*—Valerie Fee
*Attorney, Agent, or Firm*—Robert A. Kent

[57] ABSTRACT

A composition and method for acidizing a formation in the presence of ferric ion, free sulfur and/or sulfides is disclosed. The composition employs a ferric ion reducing agent and a sulfide reactant separately or in combination. The ferric ion reducing agent is a thioalkyl acid. The sulfide reactant compounds include α-diketones and saturated and α-unsaturated cyclic ketones. In another aspect, the reducing activity of the thioalkyl acid is accelerated by the presence of a catalytic quantity of a compound or mixture of compounds which yield in acid solution cuprous ion, cupric ion or combinations thereof with iodide ion.

20 Claims, No Drawings

COMPOSITION AND METHOD FOR CONTROLLING PRECIPITATION WHEN ACIDIZING WELLS

This application is a continuation of application Ser. No. 08/073,370, filed Jun. 7, 1993, pending which is a Continuation-in-part of Application Ser. No. abandoned 07/840,371 filed Feb. 24, 1992, Application Ser. No., abandoned 07/881,590 filed Jun. 29, 1992 and Application Ser. No. abandoned 07/950,374 filed Sep. 23, 1992.

BACKGROUND OF THE INVENTION

1. Technical Field of the Invention

This invention broadly relates to the treatment of a subterranean formation containing crude oil with an acidic composition to aid in the recovery of the crude oil from the formation. The invention more specifically relates to the acid treatment of such a formation in the presence of ferric ion and or sulfides. The invention still further relates to the treatment of the formation with a specific aqueous acidic composition formulated to prevent the precipitation of ferric hydroxide, free sulfur and metal sulfides in the formation and to resist the formation of sludge in the crude oil.

This invention still further pertains to the removal of sulfide from acidic solutions and to compositions for and methods of controlling the precipitation of metal sulfides when treating a sour oil and gas well in the presence of ferric ion with an acid solution.

For purposes of this invention, sludge is defined as a solid material formed in crude oil containing asphaltenes and maltenes which constituents may, under certain conditions, precipitate from the crude oil. Formation of sludge in crude oil while the crude oil is in the formation can render very difficult the task of recovery of the oil from the formation. For purposes of this invention crude oil containing quantities of asphaltenes and maltenes subject to the formation of sludge is referred to as heavy crude and sometimes as sludging crude.

2. Description of the Prior Art and Problem Solved

Formation acidizing or, simply, acidizing, is a method, well known in the prior art, utilized to increase the flow of fluid from a subterranean formation. Under these methods the formation is contacted with an acidic composition to react with and dissolve materials contained therein for the purpose of increasing the conductivity of the formation. The flow of fluid from the formation is therefore increased because of the increase in formation conductivity caused by the dissolution of the material.

A known method of acidizing a subterranean formation comprises the steps of: conducting an acid composition to the formation through tubing disposed in a borehole penetrating the subterranean formation; forcing the acid composition into contact with the formation; and permitting the acid to react with and dissolve certain materials contained therein to thereby enlarge pore spaces within the formation and thus to increase the permeability thereof. Acidizing calcareous formations, such as limestone, has been successfully conducted utilizing hydrochloric acid, certain organic acids, such as acetic acid, citric acid and formic acid, and mixtures thereof.

The object of formation acidizing—increasing formation conductivity—can be frustrated if the specific acid employed in the treatment provides an environment which fosters the production of precipitates within the formation which fill and plug the pore spaces in the formation with the consequent result of failing to increase and possibly even of decreasing formation conductivity.

The precipitation of compounds containing iron, nonferrous metals, free sulfur and metal sulfides has been a problem encountered in acidizing operations. One such problem features the precipitation of iron compounds, such as ferric hydroxide, from the acid composition used to perform the acidizing. Hydrochloric acid upon spending to pH values of about 2.5 and greater permits the precipitation of ferric hydroxide.

In one aspect, the acid may dissolve iron-containing scale from pipe and equipment and iron-containing minerals present in the formation. As the acid reacts, with consequent increase in pH of the acid solution, dissolved iron present in the solution in the ferric, Fe (III), oxidation state precipitates as ferric hydroxide ($Fe(OH)_3$). Ferric hydroxide precipitate can plug the formation and thus cause serious well damage. Iron control is thus a problem.

In another aspect, the acid may dissolve ferrous iron-containing scale from pipe and equipment and ferrous iron-containing minerals present in the formation. As the acid spends, with consequent increase in pH of the acid solution, dissolved iron present in the solution in the ferrous, Fe (II), oxidation state, upon contact with sulfide present in the solution, can precipitate as ferrous sulfide. Ferrous sulfide precipitate can plug the formation and thus cause serious well damage, Sulfide control is thus a problem.

Hydrochloric acid may precipitate sludge from the crude oil contacted. The quantity of precipitated sludge is related to formation temperature, acid concentration, ferric iron concentration and the concentration of asphaltenes and maltenes in the crude oil.

In other instances, wells containing quantities of sulfide and particularly hydrogen sulfide are sometimes referred to as "sour wells". In these instances, the combination of sulfide ions and iron create precipitation problems. Sulfide ions reduce ferric ions to ferrous ions by the following reaction:

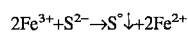

$$2Fe^{3+} + S^{2-} \rightarrow S°\downarrow + 2Fe^{2+}$$

This reaction is beneficial because ferric ions are reduced to ferrous ions with the result that precipitation of ferric hydroxide is reduced. However, the reaction is detrimental because as a result thereof, elemental or free sulfur is caused to precipitate. Sulfur precipitate can plug a formation and thus cause serious well damage.

In addition, sulfide ions can also react with ferrous ions to form ferrous sulfide, FeS, which also precipitates.

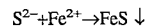

$$S^{2-} + Fe^{2+} \rightarrow FeS \downarrow$$

It is believed that sulfide ion and ferrous iron in an acid solution form a precipitate when the pH of the acid is about 1.9. The pH value of completely spent acid used to treat subsurface formations is greater than 1.9, therefore, any ferrous sulfide which may be dissolved in the unspent acid solution will precipitate when pH rises to a value of about 1.9. Like free sulfur, ferrous sulfide precipitate can plug a formation and cause serious damage.

This invention thus addresses problems encountered in acid treatment operations conducted in the presence of ferric ions, free sulfur, and/or sulfides. Therefore, when treating a sour well with acid contaminated with iron, a problem to be solved is to prevent or at least to reduce the precipitation of ferric hydroxide, free sulfur and ferrous sulfide.

Attempts to control precipitation of ferrous sulfide by maintaining the pH of the acid solution below 1.9 have failed, because it is not feasible, in most acid treatment operations, to maintain the pH of the acid solution below 1.9 during the entire operation.

SUMMARY OF THE INVENTION

This invention thus provides an aqueous acidic composition broadly comprised of an aqueous acid solution and a ferric ion reducing agent. The aqueous acid solution may include such acids as hydrochloric acid, organic acids such as acetic acid, citric acid and formic acid, and mixtures thereof. The ferric ion reducing agent very rapidly reacts with and reduces ferric ions to ferrous ions in the presence of an acid solution before the ferric ion can be reduced by any competing sulfide and before the ferric ion can produce any insoluble ferric hydroxide.

The composition finds specific use in the acidizing of oil-bearing, subterranean calcareous formations. When used in accordance with this invention, the composition will dissolve portions of the formation to thereby increase the conductivity thereof, but it will not produce, foster or otherwise generate an environment conducive to the formation of sludge and/or insoluble ferric compounds.

When the formation being treated includes a sludging crude, the composition may also include a blend of chemicals, referred to herein as antisludge agents, which inhibit the precipitation of asphaltenes and maltenes from heavy crude oil.

In another aspect, when the formation being treated contains an oil which exhibits iron enhanced sludging characteristics, the composition of this invention will reduce or eliminate the sludge caused by ferric ion contamination of the oil.

In another aspect, this invention provides a composition for preventing or at least reducing the precipitation of free sulfur, ferrous sulfide, and ferric hydroxide when treating a sulfide environment with an acid solution in the presence of ferric ion by reducing ferric ion to ferrous ion and by removing or at least reducing the sulfide content of the acid. A material, referred to herein as a sulfide reactant, is dissolved or at least dispersed in the acid solution previously described which is then placed in the presence of a sulfide environment. The sulfide reactant of this invention then reacts with and removes reactive sulfides present in the acid solution to thereby prevent precipitation of ferrous sulfide from the solution. As a result, damage caused by ferrous sulfide precipitate is prevented.

The composition of the invention also controls the precipitation of nonferrous sulfides, such as zinc sulfide and lead sulfide, by the same mechanisms described for controlling the precipitation of ferrous sulfide.

The composition of this invention is, accordingly, and more specifically, a combination of ingredients broadly comprising an aqueous acid solution, a ferric ion reducing agent, and a sulfide reactant.

In another aspect, the present invention provides a method of treating a sour well in the presence of ferric ion. The method comprises the steps of formulating an acidizing composition includes an acid solution having a ferric ion reducing agent and a sulfide reactant dissolved, or at least dispersed, therein and thereafter introducing the acidizing composition into a well to reduce ferric ion to ferrous ion and to combine with sulfides present in the acid solution to thereby prevent precipitation of metal sulfides and particularly ferrous sulfide, zinc sulfide and lead sulfide.

The acidizing composition of the present invention can be used in many ways. For example, the compositions can be used for small perforation cleanup treatments in wells with ferrous sulfide scaling and/or hydrogen sulfide present in the formation. The compositions can be used as a spearhead in the leading 25 to 33 percent of the volume of acid used for stimulating and fracturing treatments. They can be used to clean up disposal and injection wells as well as flow lines that contain ferrous sulfide. The compositions are very effective for cleaning tubing and casing in sour wells. They are useful for acidizing sweet wells with tubing obtained from a sour well or for acidizing sour wells with tubing obtained from sweet wells.

The additive composition of the present invention effectively inhibits precipitation of ferrous sulfide and other metal sulfide compounds from cleaning solutions that become contaminated with iron and sulfides when used to clean the surfaces of industrial equipment and the like.

DESCRIPTION OF PREFERRED EMBODIMENTS

In accordance with the present invention, an acidizing composition for and a method of treating a sour well are provided.

As used herein the term "well" refers to a bore, shaft, hole or wellbore penetrating a subterranean formation and all piping and equipment associated therewith. The term "well" includes both injection and production wells. As previously defined, the expression "sour well" refers to an oil and gas well that contains reactive sulfides and sulfides. The terms "sulfides" and "reactive sulfides" include free sulfide ions, sulfides combined with hydrogen in the form of hydrogen sulfide and sulfides combined with other elements, such as metals, in the form of other compounds. Examples of metal sulfides include ferrous sulfide, zinc sulfide and lead sulfide.

The ferric ion reducing agent of this invention is a compound represented by the general formula

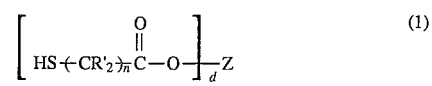

wherein n is an integer having a value in the range of from 1 to 10, Z is a group selected from R' and M and d is 1 or 2 depending upon the valence of M.

In equation (1) above, R' is selected from hydrogen, $-CH_2CO_2H$, $(CH_2)_x CH_3$ and $(CH_2)_x C_6H_5$ wherein X is a number in the range of from 0 to 6 and M is selected from sodium, potassium, ammonium, hydroxylammonium, calcium and magnesium.

A preferred ferric ion reducing agent of this invention is a compound represented by the formula

wherein R" is hydrogen and n is one.

Compounds believed to be useful herein which are within the scope of equation (1), above, include but are not limited to: thioglycolic acid, α-methylthioglycolic acid, methylthioglycolate, α, α-dimethylthio glycolic acid, α-phenylthioglycolic acid, methyl-α-methylthioglycolate, benzylthioglycolate, α-benzylthioglycolic acid, ammonium thioglycolate, calcium dithioglycolate, β-thiopropionic acid, methyl-β-thiopropionate, sodium-β-thiopropionate, thiomalic acid and thiolactic acid.

Without being held to a particular theory of operation, it is believed that the Z group in equation (1), above, in the presence of an acid, preferable a strong acid such as HCl, hydrolyzes with the net result that the functioning ferric ion reducing agent of this invention is a thioalkyl acid.

The amount of ferric ion reducing agent effective to reduce substantially all ferric ion to ferrous ion in the presence of an acid solution is believed to be dependent upon the strength of the acid and the presence or absence of a catalyst as is hereinafter further described. A preferred effective amount of ferric ion reducing agent to achieve a satisfactory rate of reduction is referred to herein as the threshold amount. By this invention, a satisfactory rate of reduction is provided by an amount of ferric ion reducing agent which will produce the required reduction in less than one hour.

For example, at a reaction environment temperature of about 72° F. the threshold amount of ferric ion reducing agent is believed to be no less than about 0.8 percent by volume of a 11.5% HCl acid solution. If concentrations of ferric ion reducing agent less than 0.8 percent are utilized, then a catalyst or combination of catalysts must be present in the acid solution together with the ferric ion reducing agent in order to reduce ferric ion to ferrous ion at a satisfactory rate of reduction. As will be further described, illustrated and understood, in subsequent Examples, the presence of a catalyst or combination of catalysts with the ferric ion reducing agent concentrations in excess of 0.8 percent by volume of acid solution improve the reduction of ferric ion to ferrous ion.

The preferred first catalytic sources are a monovalent or divalent metal ion, and more preferably copper ion releasing compounds, and most preferably cuprous chloride or cupric chloride. In this way, for example, a 15% HCl acid solution having less that 0.8% ferric ion reducing agent generally requires at least about 0.015 grams of cuprous chloride per 50 milliters of acid solution. Generally, amounts of cuprous chloride per 50 milliters of acid solution in excess of about 0.3 may result in precipitation of such chloride compounds as CuCl or $CuCl_2$.

However, for solutions having percentage acid concentrations of generally less than 15% acid the quantity of catalytic copper ion required is less than 0.01 grams. For example, a 1000 milliter acid solution of 7.5% HCl having less than 0.8% of ferric ion reducing agent present required 0.009 grams to achieve a satisfactory rate of reduction of ferric ion to ferrous ion.

The preferred second catalytic sources are compounds which solubilize and produce iodide ion (hereinafter referred to as iodide releasing compounds), and more preferably KI and NaI. For example, a 28% HCl solution including 1% by volume ferric ion reducing agent and 0.08 grams of cuprous chloride reduced 250 mg/L of ferric ion to ferrous ion. When 0.134 grams of KI was added to a similar solution of 28% HCl, 5,125 mg/L of ferric ion was reduced to ferrous ion.

Laboratory screening procedures, such as those described in subsequent Examples, may be performed to determine the acid strengths, catalyst and/or combination of catalyst, and threshold amount of ferric ion reducing agent required to reduce ferric ion to ferrous ion.

In view of the above Examples, it is believed that the minimum quantity of ferric ion reducing agent required herein for desired operation in the absence of a catalyst at 72° F. is about 0.8 percent by volume of at least a 11.5% HCl acid solution. There is no known maximum operable concentration of ferric ion reducing agent, but for practical uses it is believed that 20 percent by volume of acid is very adequate.

As previously mentioned, the ability of the ferric ion reducing agent of this invention to reduce ferric ions to ferrous ions is enhanced by use of a materials referred to herein as a catalyst. The catalyst material useful herein enable the reduction to proceed at acid strengths higher than possible in the absence of the catalyst material; and/or with a quantity of reducing agent less than required in the absence of the catalyst material; and/or faster and more complete in the presence of a quantity of reducing agent greater than or equal to such minimum required quantity of reducing agent. Although the catalyst material useful to enhance or otherwise to accelerate the activity of the reducing agent has been referred to as a catalyst, it is not known at this time whether the material itself enters into the reduction reaction or survives the reaction essentially unchanged.

As previously discussed, the catalyst material useful herein, in broad terms are referred to as first and second catalytic sources. The first catalytic sources are believed to be inorganic compounds which will dissolve in aqueous acid solution to produce monovalent and divalent non-ferrous metal ions in the presence of ferric ions and which will not produce precipitates with reactive species in the solution. In more specific terms the first catalyst materials are ones compatible with the aqueous acid which will produce cuprous or cupric ions, such as a water soluble copper salt, in the presence of ferric ion. Cuprous and cupric chloride are the most preferred first catalyst materials for use herein.

Preferably, the first catalytic material is added to the acidizing solution in the form of an acidic solution of cuprous chloride. This acidic solution of cuprous chloride is prepared by dissolving cuprous chloride in 20° Baumé hydrochloric acid (31.45 percent hydrochloric acid). The first catalytic material may be solubilized in other solvents, such as water or 15% HCl or a combination thereof. The catalyst solution thus prepared is added to the acidizing solution in an amount required to provide a quantity of cuprous chloride.

The second catalytic sources are believed to be compounds which will dissolve in aqueous acid solution to produce iodide ions in the presence of ferric ions and which will not produce precipitates with reactive species in solution. In more specific terms the second catalyst materials are ones compatible with the aqueous acid which will produce iodide ions such as water soluble iodide salts. Potassium iodide and sodium iodide are the most preferred second catalytic sources for use in combination with the first catalytic sources.

The quantity of first catalyst material or combination of first and second catalyst materials required, wherein the ratio of first to second catalyst materials is generally around 1:1, (to enhance the ability of the ferric ion reducing agent of this invention to effectively reduce ferric ion to ferrous ion) is believed to be in the range of from about 0.001 to about 1.0 moles catalyst material per mole of ferric ion reducing agent. In situations where the quantity of ferric ion reducing agent is less than the threshold quantity, as discussed above, the minimum quantity of catalyst required to produce satisfactory reduction is in the range of from about 0.023 to about 0.035 moles catalyst material per mole of ferric ion reducing agent.

The sulfide reactant employed in this invention is particularly useful as an ingredient in an acidizing solution used to treat a sour well. The sulfide reactant combines with and ties up sulfides present in the acidizing solution to thereby inhibit the precipitation of metal sulfides such as ferrous sulfide.

The sulfide reactant can be used in all types of acid solutions, including aqueous solutions comprising hydrochloric acid, hydrofluoric acid, formic acid, acetic acid and various mixtures of such acids. Preferably, the acid solution in which the sulfide reactant is dispersed or dissolved comprises hydrochloric acid. It may be desirable to mix an organic acid such as acetic acid and/or one or more salts thereof with the hydrochloric acid solution. The sulfide reactant can also be combined with additives known to be useful in acidizing operations.

The sulfide reactant is preferably admixed with the acid solution prior to introducing the solution into the well. It is important that the sulfide reactant be dispersed or dissolved in the acid solution before the acid spends to any great extent, because the sulfide reactant only reacts with sulfides in the presence of acid solution. For purposes of this invention, an acid solution is one having a pH value of less than or equal to 7. When the composition of the present invention is employed for purposes of acidizing a subterranean formation, the pH of the acid solution preferably is less then or equal to 1.

The quantity of sulfide reactant used should be in an amount at least sufficient to prevent precipitation of sulfide, such as ferrous sulfide, zinc sulfide and lead sulfide, during treatment, after the acid spends and until the spent acid can be recovered. Theoretically, the amount of the sulfide reactant to be used should be sufficient to react with all of the sulfides present, if known, but it is not detrimental to use more sulfide reactant than is theoretically needed. However, in most applications, the amount of sulfide reactant to be employed is an amount in the range of from about 0.5% to about 10%, and preferably in the range of from about 2% to about 4% reactant by volume of acid solution.

The sulfide reactant functions in an acid solution used to treat a sour well by suppressing or tying up sulfides dissolved in the acid solution to thereby decrease the amount of sulfides that are capable of reacting with ferrous iron and nonferrous metals present in the solution to effectively inhibit precipitation of ferrous sulfide, zinc sulfide and lead sulfide from the solution.

Although it is particularly useful as an additive for an acidizing solution used to treat a sour well, the sulfide reactant of the present invention can be used in many other ways. It can be used to control metal sulfide precipitation in all types of cleaning processes involving the use of acid solvents in the absence of compounds which produce ferric ion.

For example, the sulfide reactant of the present invention can be used to control precipitation during operations conducted to remove ferrous and nonferrous metal sulfide scale from the internal surfaces of industrial equipment such as feed water heaters, steam boilers, service water systems and the like. In such operations, scale is dissolved from the surfaces of the equipment by contacting the scale with a cleaning solution. If sulfide scale is removed from a ferrous surface, or if the cleaning solution otherwise becomes contaminated with sulfides and iron, precipitation of ferrous sulfide and other nonferrous metal sulfide compounds can occur. Such precipitation can interfere with the cleaning operation and can cause damage to the equipment being cleaned. The sulfide reactant of the present invention can be added to the cleaning solution to inhibit precipitation of ferrous sulfide and other nonferrous metal sulfide compounds.

The sulfide reactant of this invention functions in an acid solution used to clean the surfaces of equipment in the same way that it functions in an acid solution used to treat a sour well. By suppressing or tying up sulfides dissolved in the acid cleaning solution, the sulfide reactant effectively inhibits precipitation of ferrous sulfide, zinc sulfide and lead sulfide from the solution.

In another aspect, the evolution of hydrogen sulfide gas can be prevented upon contact of ferrous sulfide scale with an acid solution, by including in the acid a quantity of the sulfide reactant of this invention.

The method of the present invention for treating a sour well comprises the steps of formulating an acidizing composition consisting essentially of an acid solution and the sulfide reactant and introducing the acidizing composition into a sour well to combine with sulfides present therein in the substantial absence of ferric ion. As the method is carried out, precipitation of metal sulfide, such as ferrous sulfide, zinc sulfide and lead sulfide is inhibited.

As mentioned previously, it is important that the sulfide reactant be dissolved or at least dispersed in the acid solution before the acid spends to any great extent. The components can be injected and circulated in the well by any technique known in the art.

The acid solution is preferably recovered from the well after it has become substantially spent or after the well has been sufficiently treated. The spent acid can be removed from the formation via the wellbore or can be forced, through the formation to a recovery well, or can be forced over a wide area so that any precipitate that may form will have only a small detrimental effect if any.

The sulfide reactant chemically combines with sulfides present in the acid solution to thereby decrease the amount of sulfides that are capable of reacting with ferrous iron and nonferrous metals present in the solution.

The sulfide reactant includes compounds selected from the group consisting of α-unsaturated ketones, α-diketones, saturated cyclic ketones, α-unsaturated cyclic ketones and any precursors to these compounds capable of generating any of the above compounds in acid media. Such precursors include β-hydroxy ketones.

The α-unsaturated ketones of particular interest herein are compounds within the scope of the formula

(3)

wherein $R_1$, and $R_2$ are independently hydrogen, alkyl or cycloalkyl group having in the range of 1 to 6 carbon atoms per group, and benzyl groups. $R_3$ is an alkyl or cycloalkyl group having in the range of 1 to 6 carbon atoms per group and preferably an alkyl group and most preferably a methyl group.

The α-unsaturated ketones preferably have in the range of from about 3 to about 14 carbon atoms per molecule.

Particularly preferred α-unsaturated ketones useful herein are 3-butene-2-one, 3-pentene-2-one, 4-phenyl-3-butene-2-one and 5-methyl-3-pentene-2-one.

The α-diketones of particular interest herein are compounds within the scope of the formulae

(4)

and

-continued

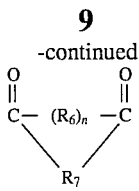
(5)

wherein $R_4$ and $R_5$ are independently alkyl and cycloalkyl groups having in the range of from about 1 to about 6 carbon atoms per group and benzyl groups. $R_6$ and $R_7$ are independently methylene groups having in the range of from about 1 to about 3 carbon atoms per group and n is an integer from 0 to about 3. $R_4$ and $R_5$ are preferably alkyl groups.

The α-dialdehydes preferably have in the range of from about 2 to about 10 carbon atoms per molecule. The α-diketones preferably have in the range of from about 3 to about 10 carbon atoms per molecule.

Particularly preferred α-diketones and α-dialdehydes useful herein are 3,4-hexanedione, 1,4-cyclohexanedione, 2-methyl-1,4-cyclohexanedione and glyoxal.

The saturated cyclic ketones and α-unsaturated cyclic ketones of particular interest herein are compounds within the scope of the formulae

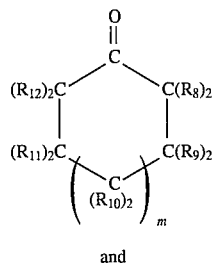
(6)

and

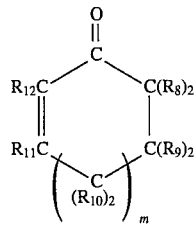
(7)

wherein $R_8$, $R_9$, $R_{10}$, $R_{11}$ and $R_{12}$ are independently hydrogen and alkyl groups having in the range of 1 to about 3 carbon atoms per group and m is an integer from 0 to 4.

The preferred saturated cyclic ketones and α-unsaturated cyclic ketones have in the range of from about 6 to about 11 carbon atoms per molecule.

Particularly useful of the above compounds, are cyclohexanone, 2-cyclohexenone, cyclopentanone, 4-methylcyclohexanone, 3-methylcyclopentanone, 2-cyclopentenone, 5-methyl-2-cyclohexenone, and 4-methyl-2-cyclopentenone.

Very effective control of precipitation of ferrous sulfide is achieved by this invention. The sulfide reactant inhibits precipitation of ferrous sulfide by combining with sulfides present in the acid solution to decrease the amount of sulfides capable of reacting with any ferrous iron also present therein.

Additives can be included in the acid composition of this invention. For example, one or more surface active agents can be employed to improve the dispersion of the components in the acid solution. Surface active agents are particularly useful when relatively long chain components are used in the acid solution. The surface active agents can be blended directly with the components by themselves or combined with the acid solution. Alternatively, the surface active agent or agents can be admixed with the acid solution before the components are added thereto. The agent or agents should be used in amounts sufficient to thoroughly disperse or dissolve the components in the acid solution. Examples of surface active agents that can be used are ethoxylated nonylphenols, fatty amines, ethoxylated fatty amines, quaternary fatty amines and ethoxylated quaternary fatty amines.

Separation of the components from, or lack of sufficient dispersion thereof, in the acid solution may occur in some instances. Such lack of dispersion may result in lower efficiency. Accordingly, use of surface active agents, as above described, may be required to help produce sufficient dispersion to avoid precipitation. It is believed that sufficient dispersion may also be obtained by constant agitation or mixing of the acid solution and the components. Satisfactory agitation is thought to be provided by turbulent flow within the tubular goods in a well. A combination of mechanical mixing and the use of surface active agents may also be employed herein to obtain sufficient dispersion.

Other additives that can be combined with the sulfide reactant in the compositions of the present invention include corrosion inhibitors, pH control additives, fluid loss additives, nonemulsifying agents, reducing agents, such as the previously described ferric ion reducing agent, oxygen scavengers, catalyst, such as the previously described ferric ion reducing agent catalyst and mutual solvents.

Oxygen scavengers can be used to reduce the amount of oxygen present in the acid solution to inhibit formation of ferric iron by oxidation of ferrous iron. Compounds such as erythorbic acid and hydroxylamine complex serve as both iron reducing agents and oxygen scavengers. Erythorbic acid also acts as an iron complexing agent.

A suitable mutual solvent for use in the present invention is ethylene glycol monobutyl ether ($C_6H_{14}O_2$). Ethylene glycol monobutyl ether helps solubilize hydrophobic components in the solution.

The aqueous acid solution useful herein includes mineral acids, organic acids and mixtures thereof. Hydrochloric acid and hydrofluoric acid are examples of mineral acids known to be useful in acidizing and are particularly useful herein. Examples of organic acids particularly useful herein are formic acid, acetic acid and propionic acid.

Other acids useful herein include sulfonic acid, fluoboric acid, citric acid, glycolic acid and lactic acid.

Mixtures of acids including mixtures of organic acids, mixtures of mineral acids and mixtures of mineral acids and organic acids are useful herein.

Hydrochloric acid and acid solutions comprised of hydrochloric acid are preferred.

Strong acids are preferred.

Reduction of the ferric iron present in the acidizing solution does decrease sludging. The addition of surfactants can further decrease sludging when used in combination with the ferric ion reducing agent of this invention to thereby decrease or prevent plugging of the formation by sludge. Such surfactants include corrosion inhibitors, and dodecylbenzenesulfonic acid. The specific surfactant and corrosion inhibitor additives will be dependent upon the specific crude oil, formation characteristics, formation type and temperature of said environment in which the composition is used.

The surfactant additives not only aid in reducing sludging, but also facilitate the separation of the produced aqueous and hydrocarbon fluids.

The following examples are provided in order to help provide a clear understanding of the compositions and method of the present invention. The examples are presented to illustrate certain specific embodiments of the invention, but they are not to be construed so as to be unduly restrictive of the scope or spirit thereof.

EXAMPLE 1

Laboratory tests were conducted to determine the ability of thioglycolic acid and combinations of thioglycolic acid and cuprous chloride to reduce ferric ion ($Fe^{3+}$) to ferrous ion ($Fe^{2+}$) in the presence of 15 percent hydrochloric acid.

The tests employed a standard ferric ion solution consisting of 100 milliliters of 36.3 grams of ferric chloride dissolved in 15 percent hydrochloric acid. Approximately 2 ml of the standard solution per 50 ml of HCl provide 5000 mg $Fe^{3+}$ per liter.

The tests also employed cuprous ion solutions consisting of 0.2 grams of cuprous chloride dissolved in 100 milliliters of 20° Be HCl (31.45 percent hydrochloric acid) and 1.02 grams of cuprous chloride dissolved in 100 milliliters of 20° Be HCl.

Unless otherwise indicated the tests were conducted at about 72° F. and atmospheric pressure.

The test solutions were analyzed for ferric ion content.

The test results are provided in Table I below.

Runs 6A and 6B show that the rate of reduction can be increased by increasing the concentration of thioglycolic acid.

Runs 6B and 6C show that the rate of reduction can be substantially increased by addition of a very small quantity of catalyst.

Referring to Runs 1–5, 6C and 6D of Table I it is evident that thioglycolic acid, when used in combination with cuprous ion, such as supplied by cuprous chloride, can be used in quantities less than required in the absence of cuprous ion to effectively reduce ferric ion.

It is thus seen that ferric ion can be reduced by thioglycolic acid alone and that reduction can be enhanced by cuprous ion in combination with the ferric ion reducing agent, or by increasing temperature or both.

EXAMPLE 2

Laboratory tests were conducted to determine the effect of ferric ion on sludge formation and the ability of Thioglycolic

TABLE I

| Run No. | 15% HCl ml | $Fe^{3+}$ mg/L | Thioglycolic acid* ml | gm | mole | Cuprous Chloride gm | moles | Reduction to $Fe^{2+}$ | Moles cuprous chloride mole thioglycolic acid | Residual $Fe^{3+}$ mg/L |
|---|---|---|---|---|---|---|---|---|---|---|
| 1 | 50 | 5000 | 0.31 | 0.411 | 0.00446 | 0.002 | 0.0000202 | No | 0.00453 | — |
| 2 | 50 | 5000 | 0.31 | 0.411 | 0.00446 | 0.004 | 0.0000404 | No | 0.0091 | — |
| 3A | 50 | 5000 | 0.31 | 0.411 | 0.00446 | 0.006 | 0.0000606 | No | 0.0135 | — |
| 3B | 50 | 5000 | 0.5 | 0.6625 | 0.0072 | 0.006 | 0.0000606 | Yes[1] | 0.00841 | 0 |
| 4 | 50 | 5000 | 0.31 | 0.411 | 0.00446 | 0.01 | 0.000101 | No | 0.0226 | — |
| 5 | 50 | 5000 | 0.31 | 0.411 | 0.00446 | 0.0153 | 0.000155 | Yes[2] | 0.0348 | 0 |
| 6A | 50 | 65 | 0.31 | 0.411 | 0.00446 | 0 | 0 | Yes | 0 | 0[11] |
| 6B | 50 | 65 | 0.4 | 0.53 | 0.00575 | 0 | 0 | Yes | 0 | 0[12] |
| 6C | 50 | 65 | 0.4 | 0.53 | 0.00575 | 0.0015 | 0.000015 | Yes | 0.00261 | 0[13] |
| 6D | 50 | 5000 | 0.4 | 0.53 | 0.00575 | 0.575 | 0.00575 | Yes[3] | 1.0 | 0 |
| 7 | 50 | 2500 | 0.9 | 1.1925 | 0.0129 | — | — | Yes[4] | — | 0 |
| 8A | 50 | 7500 | 0.9 | 1.1925 | 0.0129 | — | — | Yes[5] | — | <100 |
| 8B | 50 | 10000 | 0.9 | 1.1925 | 0.0129 | — | — | Yes[6] | — | <250 |
| 9 | 50 | 10000 | 3.6 | 4.77 | 0.0518 | — | — | Yes[7] | — | 0 |
| 10 | 50 | 27500 | 3.6 | 4.77 | 0.0518 | — | — | Yes[8] | — | <50 |
| 11 | 50 | 37500 | 3.6 | 4.77 | 0.0518 | — | — | Yes[9] | — | <250 |
| 12 | 50 | 40000 | 3.6 | 4.77 | 0.0518 | — | — | Yes[10] | — | 100 to 250 |

*density of Thioglycolic acid: 1.325 gm/ml (97% by weight).
*molecular weight of Thioglycolic acid: 92.12
[1]Thioglycolic acid was added to the solution of Run 3A after it was seen that no reduction had occurred in Run 3A. After addition of more reducing agent, ~0.19 mls, reduction rapidly occurred with no residual $Fe^{3+}$ detected in less than 1 minute.
[2]All ferric ion was reduced to ferrous ion in less than 2 minutes.
[3]All ferric ion was substantially instantaneously reduced to ferrous ion.
[4]No detectable residual ferric ion in less than one minute.
[5]Less than 100 mg/L residual $Fe^{3+}$ in less than one minute.
[6]Run 8B was performed at 180° F. after adding 2500 mg/L $Fe^{3+}$ to Run 8A. After 10 minutes the residual $Fe^{3+}$ was less than 250 mg/L.
[7]No detectable residual ferric ion in less than one minute.
[8]Less than 50 mg/L residual $Fe^{3+}$ in less than one minute.
[9]Less than 250 mg/L residual $Fe^{3+}$ in less than one minute.
[10]After 5 minutes at about 72° F. the amount of residual $Fe^{3+}$ was between 100 and 250 mg/L.
[11]Total reduction occurred in about 97 minutes.
[12]Total reduction occurred in about 50 minutes.
[13]Total reduction was substantially instantaneous.

Referring to Runs 6A, 6B, 7, 8A, 8B, 9, 10, 11, and 12 of Table I, it is evident that thioglycolic acid is an effective reducing agent for ferric ion at temperatures at least as low as 72° F. and in the absence of any cuprous ion. Comparing runs 8A, 8B, and 9 shows that ferric ion can be reduced by increasing temperature (Run 8B) or increasing thioglycolic acid (Run 9).

acid with cuprous chloride catalyst to reduce or eliminate the affect.

Three tests were carried out on each crude oil.

Test Procedure*

A. Mix acid solutions 1. 50 mL 15% HCl with no $Fe^{3+}$
2. 50 mL 15% HCl with 5,000 mpL $Fe^{3+}$ 3. 50 mL 15% HCl with 5,000 mpL $Fe^{3+}$, 0.4 mL thioglycolic acid and 1.5 mL CuCl concentrate (concentrate: 1.02g CuCl in 100 mL 20° Be HCl)

B. Add 50 mL crude oil to acid solution and shake.

C. Place crude oil and acid solution in heating bath (194° F.) for 20 minutes.

D. Vacuum filter results from "C" through pre-weighed Whatman 934-AH paper.

E. Wash filter cake with 100 mL hot water (194° F.).

F. Vacuum oven dry and weigh. Record results.

* no antisludging additives were used

Table II lists recorded results.

TABLE II

SLUDGE TESTING

| Crude Oil Formation | 1<br>0 $Fe^{3+}$<br>grams sludge | 2<br>5,000 mpL $Fe^{3+}$<br>grams sludge | 3<br>5,000 mpL $Fe^{3+}$/<br>$RA^1$<br>grams sludge |
|---|---|---|---|
| Bigory | 1.21 | 2.02 | 0.81 |
| Nisku Creek | 1.27 | 1.34 | 1.05 |
| Keg River | 1.74 | 2.07 | 1.35 |
| Muskeg | 1.37 | 1.60 | 0.83 |

$^1$RA is the reducing agent, thioglycolic acid and cuprous chloride.

Column 1 shows sludge produced by 15% HCl alone. This serves as a base line number. Column 2 shows the effect of 5,000 mg/L ferric iron in the acid. Clearly, these oils show iron enhanced sludging characteristics in varying degrees. Column 3 shows results produced with the acid composition of this invention. The results show the thioglycolic acid/cuprous chloride additive to be very effective in reducing sludging caused by ferric iron.

EXAMPLE 3

Laboratory tests similar to those performed in Example 1 were conducted to determine the ability of cuprous chloride to aid in the reduction of a total of 12,500 mg/L of $Fe^{3+}$ by a relatively large concentration of thioglycolic acid (0.0129 moles). The test conditions and chemicals used were the same as those used in Example 1. The results should be compared with Run 7 and Run 8A of Example 1.

| Ingredient | Recipe Run 1 | Run 2 |
|---|---|---|
| 15% HCl | 50 ml | 50 ml |
| 97% Thioglycolic acid | 0.9 ml | 0.9 ml |
| $Fe^{3+}$ | * | * |
| CuCl | 0 | 0.00073 moles |
| mole ratio | 0 | 0.0566 |

*$Fe^{3+}$, as standard Ferric ion solution (see Example 1), was added in 5 aliquots of 2,500 mg/L $Fe^{3+}$ each until a total of 12,500 mg/L $Fe^{3+}$ had been added.

In Run 1 the catalyst was not employed. The reduction slowed considerably after a concentration of 7,500 mg/L $Fe^{3+}$ had been added. With a total of 12,500 mg/L $Fe^{3+}$ the thioglycolic acid had failed to completely reduce the $Fe^{3+}$ to $Fe^{2+}$ after more than eight hours.

In Run 2 the catalyst was employed. The $Fe^{3+}$ was substantially instantaneously reduced to $Fe^{2+}$ as each aliquot was added.

Furthermore, Example 3 illustrates catalytic enhancement at thioglycolic acid concentrations greater than the threshold value of 0.08%.

EXAMPLE 4

Laboratory tests were conducted to determine the efficiency of thioglycolic acid with a cuprous chloride catalyst to reduce ferric iron in sour gas well environment.

Test Procedure:

A. An acid solution having the following components was prepared.
1. 100 ml 15% HCl
2. 0.45 grams ferrous chloride (3.58 mmoles)
3. 0.675 grams thioacetamide (8.98 mmoles)
4. 1 ml thioglycolic acid (97%) (13.95 mmoles)
5. 1 ml cuprous chloride concentrate. Cuprous chloride concentrate was prepared by dissolving 4 grams of cuprous chloride in 100 ml 20° Be HCl.

B. Heat acid solution to 175° F. At this temperature hydrogen sulfide was generated from thioacetamide. The presence of hydrogen sulfide in the acid solution simulated sour gas well conditions.

C. Cool acid mixture to room temperature and treat with the ferric iron concentrate provide in Example 1.

Results:

The quantity of ferric iron reduced was 9,000 mg/L without the production of sulfur and only very small quantities of cupric sulfide produced.

Example 4 illustrates that thioglycolic acid combined with a cuprous ion catalyst will successfully reduce ferric to ferrous iron in a sour gas environment as well as prevent precipitation of elemental sulfur by eliminating the ferric iron reaction with hydrogen sulfide.

EXAMPLE 5

Laboratory tests were conducted to illustrate that the combination of thioglycolic acid with cuprous chloride catalyst effectively reduces ferric iron generated by the dissolution of $Fe_2O_3$ (hematite) by 15% HCl at elevated temperatures.

Test Procedure:

A. An acid solution having the following components was prepared.
1. 90 ml 15% HCl
2. 7.2 ml thioglycolic acid (103.56 mmoles)
3. 3 ml cuprous chloride concentrate (0.12 grams CuCl). Cuprous chloride concentrate was prepared by dissolving 4 grams of cuprous chloride in 100 ml 20° Be HCl.
4. 7.7 grams $Fe_2O_3$ (96.4 mmoles of ferric iron)

B. While stirring, the acid solution was heated to 175° F.

Results:

Within 15 minutes, all $Fe_2O_3$ had dissolved. The resulting solution was clear and colorless indicating a visual absence of ferric iron. The amount of ferric iron reduced was 53,850 mg/L or about a 93% yield.

EXAMPLE 6

Laboratory tests were conducted to determine the ferric ion reduction rate enhancement in acid solutions of 28%, 20% and 15% HCl using a combination of the first and second catalytic materials with 97% thioglycolic acid. The results for runs 1–12 are provided in Table III. The iron concentration in Example 6 was the same as Example 1.

TABLE III

| Runs | 1 | 2 | 3 | 4 | 5 | 6 | 7 | 8 | 9 |
|---|---|---|---|---|---|---|---|---|---|
| Ingredients: | | | | | | | | | |
| % HCl (98 ml) | 15 | 15 | 15 | 28 | 28 | 28 | 28 | 28 | 28 |
| Thioglycolic(ml) | 1.0 | 1.0 | 1.0 | 1.0 | 1.0 | 1.0 | 1.0 | 1.0 | 1.0 |
| CuCl (grams) | 0.04 | 0.04 | 0.04 | 0.04 | 0.04 | 0.04 | 0.08 | 0.08 | 0.6 |
| KI (grams) | 0 | .067 | .134 | 0 | .067 | .134 | 0 | .134 | 0 |
| Cu/I ratio | 0 | 1:1 | 1:2 | 0 | 1:1 | 1:2 | 0 | 1:1 | 0 |
| $Fe^{+3}$ (mg/L) | 6750 | 7500 | 7625 | 250 | 3750 | 4500 | 250 | 5125 | 6125 |

| Runs | 10 | 11 | 12 |
|---|---|---|---|
| % HCl (98 ml) | 20 | 20 | 20 |
| Thioglycolic(ml) | 1 | 1 | 1 |
| CuCl (grams) | 0.04 | 0.04 | 0.04 |
| KI (grams) | 0 | 0.067 | 0.134 |
| Cu/I ratio | 0 | 1:1 | 2:1 |
| $Fe^{+3}$ | 5250 | 7275 | 7500 |

EXAMPLE 7

Laboratory tests were conducted to illustrate the efficiency of thioglycolic acid and cuprous chloride catalyst at various acid concentrations in reducing ferric to ferrous iron. Ferric iron reduction is illustrated in mg/L. The total volume of the test solutions was 100 ml. The iron concentration in Example 7 was the same as Example 1.

TABLE IV

| ml Thioglycolic | (mmoles) | 7.5% HCl | 15% HCl | 20% HCl |
|---|---|---|---|---|
| 0.2 | 2.8 | 1500 | 1000 | 750 |
| 0.4 | 5.57 | 2875 | 2500 | 2125 |
| 0.6 | 8.63 | 4375 | 3500 | 3375 |
| 0.8 | 11.4 | 5875 | 4500 | 4000 |
| 1.0 | 14.3 | 6875 | 6750 | 5250 |

Table IV illustrates that reduction of ferric to ferrous iron by thioglycolic acid in combination with cuprous chloride catalyst is more effective at lower acid strengths. In other words, as the acid spends on the formation, greater reduction is achieved.

EXAMPLE 8

The purpose of this example is to determine the ability of certain compounds to react with sulfide ion in the presence of live acid. The test procedure features the generation of hydrogen sulfide in live acid in the presence of the compound to be tested; permitting reaction to occur to thereby produce an organic residue; extracting the residue with ether; and analyzing the residue for sulfur content.

The percent of sulfur determined by analysis to be present in the residue is divided by the percent of sulfur which would be present in the residue if all of the compound tested had reacted with the sulfur available for reaction. The number result of the division calculation is multiplied by 100 and reported as "yield". The highest theoretical "yield" is 100. The lowest is zero.

The specific experimental procedure is set out below.

1. Deoxygenate 100 milliliters of 15% HCl
2. To a nitrogen filled glass pressure vessel, add 2.0 grams of thioacetamide (TAA) and a magnetic stir bar. Then, under a nitrogen flush, add to the pressure vessel 100 milliliters of deoxygenated 15% HCl solution using a syringe equipped with a teflon needle, and then add 0.02 moles of the compound to be tested. Close the vessel and immerse it in an oil bath preheated to 200° F.
3. Vigorously stir the contents of the vessel for 2 hours, then remove the vessel from the bath and allow it to cool to ambient temperature.
4. Pour the contents of the vessel into a 125 milliliter separatory funnel, and slowly add the contents to a stirring slurry consisting of 25 grams of $CaCO_3$ in 50 milliliters of deionized water.
5. After the addition is complete, let the mixture stand an additional 12 hours.
6. Extract the mixture three times with 100 milliliter aliquots of ether, and separate and combine the organic phase produced by each extraction. Add several grams of anhydrous $MgSO_4$, cap the solution and set aside for 24 hours.
7. Filter the extract phase to remove drying agent and concentrate the product by roto-evaporation.
8. Analyze the product for carbon, hydrogen and sulfur and calculate yield, as described above.

The results of the tests are reported in Table V, below.

TABLE V

| | Sulfide Reactant Activity | | | |
|---|---|---|---|---|
| Compound Tested | % C | % H | % S | Yield |
| methylethylketone | * | * | * | 0 |
| acetone | * | * | * | 0 |
| 3-octanone | 69.0 | 11.7 | 0.4 | 2 |
| pinacolone | * | * | * | 0 |
| acetylacetone | * | * | * | 0 |
| 1,4-cyclohexanedione | 59.0 | 6.7 | 13.0 | 13 |
| 3,4-hexanedione | 50.6 | 7.8 | 28.0 | 64 |
| cyclohexanone | 70.1 | 10.1 | 1.4 | 5 |
| 2-cyclohexenone | 65.3 | 8.2 | 4.5 | 16 |
| propiophenone | 77.0 | 7.6 | 0.1 | 1 |
| 4-phenyl-3-butenone | 72.6 | 7.4 | 8.4 | 43 |
| methylvinylketone | 53.3 | 7.4 | 29.2 | 69 |
| pentenone mixture[1] | 58.3 | 9.0 | 18.5 | 62 |
| mesityl oxide | 49.0 | 7.6 | 11.3 | 40 |
| 5-methyl-3-hexenone | 55.2 | 8.4 | 3.5 | 14 |

Note: An asterisk (*) in the table indicates that analysis for the component was not made
[1] 70/30 mixture of 3-pentene-2-one/mesityl oxide Referring to Table V, it is evident that certain compounds were very active in the removal of sulfide ion from live acid. Examination of the results clearly shows that specific structural attributes were necessary to produce the desired reactivity. It was found that α-unsaturated ketones, α-diketones, cyclic saturated and cyclic α-unsaturated ketones and cyclic diones would react with hydrogen sulfide in live acid. Saturated straight chain and/or branched chain ketones failed as did arylalkyl ketones and α, γ-diones.

EXAMPLE 9

The purpose of this example is to determine the ability of certain compounds to inhibit the formation of ferrous sulfide precipitate in the presence of live acid and in the absence of air. The test procedure is conducted under high pressure/high temperature, anaerobic conditions in a See Through Cell without agitation of cell contents and in the absence of a chemical dispersant or mutual solvent.

The test results, which are shown in Table VI, note the presence of iron sulfide precipitate and whether the compound tested did or did not separate from the acid.

PROCEDURE FOR ANAEROBIC IRON/SULFUR CONTROL STUDIES

Preparation of standard acid and iron solutions

Standard 15% acid solutions are prepared with reagent grade hydrochloric acid and deionized water. Prior to making the solution, the water is deoxygenated by purging it with nitrogen gas for at least two hours.

Iron(II) solutions are prepared with deoxygenated water and anhydrous iron(II) chloride. The anhydrous iron salt is weighed in a glove bag and loaded into a Schlenk tube. Water is added via syringe or pipet. The resulting solution is stored in a Schlenk tube and kept under nitrogen at all times.
Preparation of See-Through cell and pressure addition funnel The Cell is assembled in the usual manner after being charged with Icelandic Spar (calcium carbonate) and preheated to 200° F. The Cell is then pressurized to 200 psi with nitrogen and vented five times to remove oxygen. The Cell is then pressurized to 200 psi with nitrogen. The pressure addition funnel is connected to the Cell and purged by opening the main valve of the cell and bleeding nitrogen into the funnel. After several minutes of purging, the main valve is closed and the funnel capped with a rubber septum until used. The nitrogen connection to the funnel is purged to remove oxygen before attachment to the system. The reaction mixture, as prepared below, is injected onto the Icelandic Spar during which time the Cell pressure is quickly raised to 500 psi.
Preparation of the reaction mixture The required quantity of 15% HCl is poured into a Schlenk tube which has been evacuated and back-filled with nitrogen gas. A teflon coated magnetic stir bar is added and the vessel capped. The tube is immersed in an ice bath and allowed to cool for ten minutes then subjected to dynamic vacuum for fifteen minutes to remove all dissolved oxygen from the solution. The tube is then back-filled with nitrogen and opened with a vigorous flow of nitrogen being maintained at all times. Next, a pipet is thoroughly flushed with nitrogen and used to transfer an aliquot of concentrated Iron(II) solution into the tube. Finally, the sulfide reactant and all remaining components are added and the mixture stirred until homogeneous. The solution is transferred to the prepared reaction vessel via a preflushed syringe. The syringe must have a Teflon™ needle as stainless steel is quickly corroded by the strong halo-acid.

When reaction is complete and the acid has spent then observations are made, the observed results are recorded in Table VI, below.

TABLE VI

| High Temperature/High Pressure Cell Reactions* | | |
|---|---|---|
| Sulfide Reactant | Amt. of Iron Sulfide Formed | Separation |
| none | very large | N/A |
| mesityl oxide | small | yes |
| methylvinylketone | none | no |

*15% HCl, 5,000 mg/L Fe (II), 2% sulfide reactant, TAA (thioacetamide) at 1:1 with respect to iron, 500–700 psi, 200° F., 6 hrs.

Referring now to Table VI, the following observations may be made. Methylvinylketone gave excellent results. No separation occurred and no iron sulfide formed. The spent acid solution was clear and colorless.

Problems were encountered with mesityl oxide. This material separated immediately and therefore was not in the live acid solution when H$_2$S was generated. The experiment failed to completely prevent formation of iron sulfide as a small quantity formed using mesityl oxide.

It will be clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed:

1. A method of controlling the precipitation of sulfides from a acidic solution containing sulfides comprising:

contacting said acidic solution containing sulfides with a sulfide reactant wherein said sulfide reactant is selected from the group consisting of compounds of the following formulae:

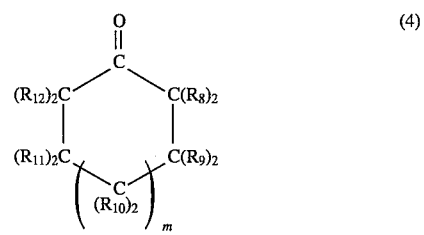

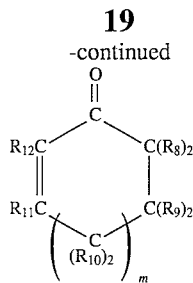

and mixtures thereof; wherein $R_1$, and $R_2$ are independently alkyl and cycloalkyl groups having in the range of 1 to 6 carbon atoms per group, and benzyl groups, $R_3$, $R_4$ and $R_5$ are independently hydrogen, alkyl or cycloalkyl groups having in the range of 1 to 6 carbon atoms per group and benzyl groups, $R_6$ and $R_7$ are independently methylene, ethylene or propylene groups, $R_8$, $R_9$, $R_{10}$, $R_{11}$ and $R_{12}$ are independently hydrogen and alkyl groups having in the range of 1 to 3 carbon atoms per group, n is an integer having a value from 0 to 3, and m is an integer having a value from 0 to 4.

2. The method of claim 1 wherein $R_3$, $R_4$ and $R_5$ are alkyl groups; and wherein the compounds within the scope of said formula (1) contain 3 to 14 carbon atoms, the compounds within the scope of said formula (2) contain 2 to 10 carbon atoms, the compounds within the scope of said formula (3) contain 2 to 10 carbon atoms, the compounds within the scope of said formula (4) contain 6 to 11 carbon atoms and the compounds within the scope of said formula (5) contain 6 to 11 carbon atoms.

3. The method of claim 2 wherein said acidic solution comprises hydrochloric acid.

4. The method of claim 2 wherein said sulfide reactant is selected from the group consisting of 3-butene-2-one, 3-pentene-2-one, 4-phenyl-3-butene-2-one, 5-methyl-3-penten-2-one, 3,4-hexanedione, 1,4-cyclohexanedione, 2-methyl-1,4-cyclohexanedione, cyclohexanone, 2-cyclohexenone, cyclopentanone, 4-methylcyclohexanone, 3-methylcyclopentanone, 2-cyclopentenone, 5-methyl-2-cyclo hexenone and 4-methyl-2-cyclopenteneone.

5. The method of claim 2 wherein said acidic solution includes an agent to disperse said sulfide reactant in said acidic solution.

6. A Method of treating a subterranean formation containing sulfides comprising:

contacting the formation with an acidic solution whereby sulfides are caused to be present in said acidic solution; and contacting the formation with a sulfide reactant whereby precipitation of sulfides from the acidic solution is substantially prevented upon spending of the acidic solution, said sulfide reactant being selected from the group consisting of compounds of the following formula

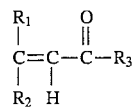

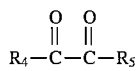

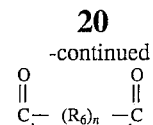

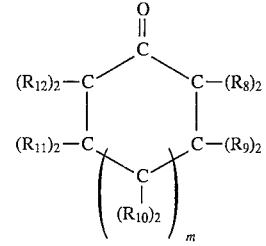

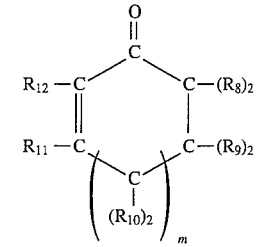

and mixtures thereof; wherein $R_1$, and $R_2$ are independently alkyl and cycloalkyl groups having in the range of 1 to 6 carbon atoms per group, and benzyl groups, $R_3$, $R_4$ and $R_5$ are independently hydrogen, alkyl or cycloalkyl groups having in the range of 1 to 6 carbon atoms per group and benzyl groups $R_6$ and $R_7$ are independently methylene, ethylene or propylene groups, $R_8$, $R_9$, $R_{10}$, $R_{11}$ and $R_{12}$ are independently hydrogen and alkyl groups having in the range of 1 to 3 carbon atoms per group, n is an integer having a value from 0 to 3, and m is an integer having a value from 0 to 4.

7. The method of claim 6 Wherein $R_3$, $R_4$ and $R_5$ are alkyl groups; and wherein the compounds within the scope of said formula (1) contain 3 to 14 carbon atoms, the compounds within the scope of said formula (2) contain 2 to 10 carbon atoms, the compounds within the scope of said formula (3) contain 2 to 10 carbon atoms, the compounds within the scope of said formula (4) contain 6 to 11 carbon atoms and the compounds within the scope of said formula (5) contain 6 to 11 carbon atoms.

8. The method of claim 6 wherein said acidic solution comprises hydrochloric acid.

9. The method of claim 6 wherein said sulfide reactant is selected from the group consisting of 3-butene-2-one, 3-pentene-2-one, 4-phenyl-3-butene-2-one, 5-methyl-3-penten-2-one, 3,4-hexanedione, 1,4-cyclohexanedione, 2-methyl-1,4-cyclohexanedione, cyclohexanone, 2-cyclohexenone, cyclopentanone, 4-methylcyclohexanone, 3-methylcyclopentanone, 2-cyclopentenone, 5-methyl-2-cyclo hexenone and 4-methyl-2-cyclopenteneone.

10. The method of claim 6 wherein said acidic solution includes an agent to disperse said sulfide reactant in said acidic solution.

11. A composition comprising:

an aqueous acid solution;

a ferric ion reducing agent present in an amount of at least about 0.8 percent by volume of said acid solution wherein said ferric ion reducing agent is a compound of the general formula

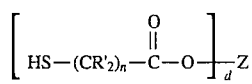

wherein n is an integer having a value in the range of from 1 to 10, Z is selected from R' and M, d is an integer having a value of 1 or 2 depending upon the valence of M, R' is selected from hydrogen, $(CH_2)_x\ CH_5$ and $(CH_2)_x\ C_6H_6$ wherein X is an integer having a value in the range of from 0 to 6 and M is selected from sodium, potassium, hydroxylammonium, ammonium, calcium and magnesium; and a sulfide reactant, wherein said sulfide reactant is selected from the group consisting of compounds of the following formula

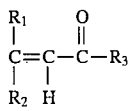 (1)

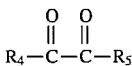 (2)

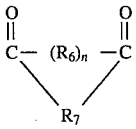 (3)

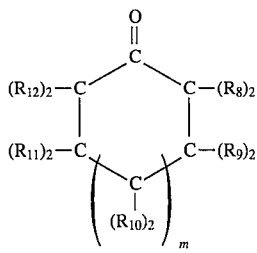 (4)

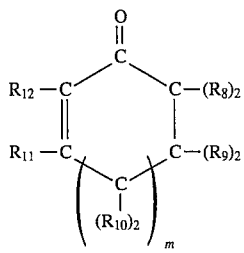 (5)

and mixtures thereof; wherein $R_1$, and $R_2$ are independently hydrogen, alkyl and cycloalkyl groups having in the range of 1 to 6 carbon atoms per group, and benzyl groups, $R_3$, $R_4$ and $R_5$ are independently alkyl and cycloalkyl groups having in the range of 1 to 6 carbon atoms per group and benzyl groups, $R_8$, $R_9$, $R_{10}$, $R_{11}$ and $R_{12}$ are independently hydrogen and alkyl groups having in the range of 1 to 3 carbon atoms per group, n is an integer having a value from 0 to 3, and m is an integer having a value from 0 to 4.

12. The composition of claim 11 wherein the sulfide reactant is selected from the group consisting of α-unsaturated ketones, α-diketones, saturated cyclic ketones and α-unsaturated diketones.

13. The composition of claim 11 wherein said sulfide reactant is present in an amount in the range of from about 0.5 to about 10 percent by volume of said acid solution.

14. The composition of claim 11 wherein said sulfide reactant is methyl vinyl ketone.

15. A method of treating a subterranean formation comprising:

contracting the formation with an aqueous acid solution; which includes a ferric ion reducing agent present in an amount of at least about 0.8 percent by volume of said acid solution wherein said ferric ion reducing agent is a compound of the general formula

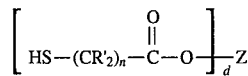

wherein n is an integer having a value in the range of from 1 to 10, Z is selected from R' and M, d is an integer having a value of 1 or 2 depending upon the valence of M, R' is selected from hydrogen, $(CH_2)_x\ CH_3$ and $(CH_2)_x\ C_6H_6$ wherein X is an integer having a value in the range of from 0 to 6 and M is selected from sodium, potassium, hydroxylammonium, ammonium, calcium and magnesium; and a sulfide reactant, wherein said sulfide reactant is selected from the group consisting of compounds of the following formula

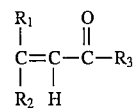 (1)

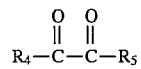 (2)

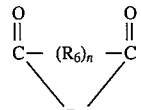 (3)

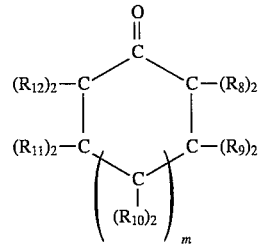 (4)

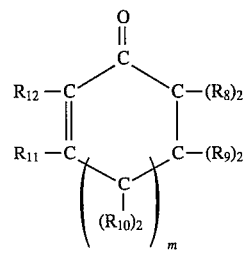 (5)

and mixtures thereof; wherein $R_1$, and $R_2$ are independently hydrogen, alkyl and cycloalkyl groups having in the range of 1 to 6 carbon atoms per group, and benzyl groups, $R_3$, $R_4$ and $R_5$ are independently alkyl and cycloalkyl groups having in the range of 1 to 6 carbon atoms per group and benzyl groups.

$R_6$ and $R_7$ are independently methylene, ethylene or propylene groups, $R_8$, $R_9$, $R_{10}$, $R_{11}$ and $R_{12}$ are independently hydrogen and alkyl groups having in the range of 1 to 3 carbon atoms per group, n is an integer having a value from 0 to 3, and m is an integer having a value from 0 to 4.

16. The method of claim 15 wherein the sulfide reactant is selected from the group consisting of α-unsaturated ketones, α-diketones, saturated cyclic ketones and α-unsaturated diketones wherein said sulfide reactant is present in said composition in an amount effective to prevent the precipitation of metal sulfides.

17. The method of claim 15 wherein said sulfide reactant is present in an amount in the range of from about 0.5 to about 10 percent by volume of said acid solution.

18. The method of claim 15 wherein said sulfide reactant is methyl vinyl ketone.

19. The method of claim 15 wherein said reducing agent is selected from the group consisting of thioglycolic acids, salts of thioglycolic acids and esters of thioglycolic acids.

20. The method of claim 15 wherein said reducing agent is thioglycolic acid.

* * * * *